(12) United States Patent
Hess et al.

(10) Patent No.: US 10,142,723 B2
(45) Date of Patent: Nov. 27, 2018

(54) MOTOR VEHICLE COMBINED INSTRUMENT HAVING A HELMHOLTZ RESONATOR AS ACOUSTIC ELEMENT

(71) Applicant: Johnson Controls Automotive Electronics GmbH, Remchingen (DE)

(72) Inventors: Engelhard Hess, Ostfildern (DE); Marcus Weber, Renningen (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 14/908,780

(22) PCT Filed: Jul. 29, 2014

(86) PCT No.: PCT/EP2014/066309
§ 371 (c)(1),
(2) Date: Mar. 15, 2016

(87) PCT Pub. No.: WO2015/014855
PCT Pub. Date: Feb. 5, 2015

(65) Prior Publication Data
US 2016/0241949 A1 Aug. 18, 2016

(30) Foreign Application Priority Data

Aug. 1, 2013 (DE) .................. 10 2013 012 721

(51) Int. Cl.
*H04R 1/20* (2006.01)
*H04R 1/28* (2006.01)
(Continued)

(52) U.S. Cl.
CPC .............. *H04R 1/2811* (2013.01); *B60C 9/00* (2013.01); *B60K 37/00* (2013.01); *B60K 37/02* (2013.01);
(Continued)

(58) Field of Classification Search
CPC .............................. H04R 2499/13; H04R 1/02
(Continued)

(56) References Cited

U.S. PATENT DOCUMENTS 4,166,933 A * 9/1979 Cinquino ............... H04R 1/025
181/159
5,108,335 A * 4/1992 Carey ................. B60R 16/0207
348/729
(Continued)

FOREIGN PATENT DOCUMENTS

DE 10 2012 009 917 A1 11/2012
FR 2917055 A1 12/2008
(Continued)

OTHER PUBLICATIONS

International Search Report and Written Opinion of the International Searching Authority dated Dec. 19, 2014, in corresponding International Application No. PCT/EP2014/066309, 10 pages.
(Continued)

*Primary Examiner* — Alexander Jamal
(74) *Attorney, Agent, or Firm* — Quinn IP Law

(57) ABSTRACT

A motor vehicle combined instrument panel has a front housing directed towards a vehicle occupant and a plate which is provided on the housing and has a loudspeaker.

9 Claims, 4 Drawing Sheets

(51) Int. Cl.
*B60K 37/00* (2006.01)
*B60R 11/02* (2006.01)
*B60C 9/00* (2006.01)
*H04R 1/32* (2006.01)
*B60K 37/02* (2006.01)
*H04R 1/02* (2006.01)
*B60R 11/00* (2006.01)

(52) U.S. Cl.
CPC ........ *B60R 11/0217* (2013.01); *H04R 1/2884* (2013.01); *H04R 1/323* (2013.01); *B60K 2350/965* (2013.01); *B60R 2011/0005* (2013.01); *H04R 1/025* (2013.01); *H04R 1/028* (2013.01); *H04R 2499/13* (2013.01)

(58) Field of Classification Search
USPC ............................ 381/338, 345, 347, 348, 86
See application file for complete search history.

(56) References Cited

U.S. PATENT DOCUMENTS

| | | | | |
|---|---|---|---|---|
| 2005/0111673 | A1* | 5/2005 | Rosen | B60R 11/0217 381/89 |
| 2009/0174682 | A1 | 7/2009 | Bowden et al. | |
| 2010/0092006 | A1* | 4/2010 | Rosen | H04R 1/2834 381/86 |
| 2013/0058518 | A1* | 3/2013 | Held | G10K 9/00 381/386 |

FOREIGN PATENT DOCUMENTS

| | | |
|---|---|---|
| JP | 2007-003630 A | 1/2007 |
| JP | 2007-069886 A | 3/2007 |
| JP | 2009-260910 A | 11/2009 |
| JP | 2013-120159 A | 6/2013 |

OTHER PUBLICATIONS

Office Action dated Jul. 29, 2014, received in corresponding German application No. 10 2013 012 721.1, (6 pages) and English translation (5 pages).

Office Action dated Jun. 12, 2018, in corresponding Japanese application No. 2016-530499, (6 pages) and English translation (5 pages).

* cited by examiner

MOTOR VEHICLE COMBINED INSTRUMENT HAVING A HELMHOLTZ RESONATOR AS ACOUSTIC ELEMENT

CROSS REFERENCE TO RELATED APPLICATIONS

The present application is a U.S. National Stage of International Application No. PCT/EP2014/066309 filed on Jul. 29, 2014, which claims the benefit of German Patent Application No. 10 2013 012 721.1 filed on Aug. 1, 2013, the entire disclosures of all of which are incorporated herein by reference.

The present invention relates to a motor vehicle combined instrument having a front housing which is directed toward a vehicle occupant, and a circuit board which is provided on the housing and which has a loudspeaker.

Motor vehicle combined instruments, such as are known, for example, from FR 2 917 055, contain loudspeaker systems and/or relays for generating various noises, for example the clicking noise of the flashing indicator light and/or other sounds. The sounds to be generated are mostly warning sounds and/or warning signals, for example seat belt warning, door open warning, temperature warning, lane exiting warning, black ice warning and many others. However, with the ever greater propagation of driver assistance systems, apart from warning sounds in the future other acoustic signals will also be conceivable as warning sounds. This includes the outputting of voices as well as melodies or of other sounds than the sound of the flashing indicator light.

According to the prior art, loudspeakers and warning buzzers, which are mounted on the rear side of the motor vehicle combined instrument, are used to output these noises. All these motor vehicle combined instruments have the disadvantage that the sound which is generated is output rearward from the combined instrument, and as a result of which it is greatly damped by the instrument panel with the result that only a fraction of the sound pressure which is originally generated arrives at the driver. Furthermore, the known designs which contain numerous slits and holes in the rear wall lead to the partial extinguishing of sound waves, in particular of frequencies below 3000 Hz. However the main frequency components of the acoustic signals which are output lie in this frequency range. As a result, the sound pressure which arrives at the driver is reduced further.

The object of the present invention has therefore been to make available a motor vehicle combined instrument which does not have the disadvantages of the prior art.

The object is achieved with a motor vehicle combined instrument having a front housing which is directed toward a vehicle occupant, and a circuit board which is provided on the front housing and which has a loudspeaker, wherein the loudspeaker is arranged in and/or on an acoustic element which acts as a Helmholtz resonator.

The present invention relates to a motor vehicle combined instrument with which, for example, the speed, the rotational speed of the engine and/or the temperature of the engine can be displayed and with which also acoustic and/or visual warning messages can be output. Such a motor vehicle combined instrument often also has information about what is referred to as an infotainment system. According to the invention, the motor vehicle combined instrument has a front housing which is directed toward the vehicle occupant, and a circuit board. There can, for example, a scale on the front housing, in particular as a cover and therefore in a way which is visible to the vehicle occupant, be provided, and with which, for example, the speed of the vehicle and/or the rotational speed of the engine and/or other functions are displayed. The cover preferably also has symbols which alert the vehicle occupant to operating states of the vehicle. The cover can be provided in one piece with the front housing. The electronics which are required for the motor vehicle combined instrument are provided on the circuit board. The circuit board is preferably connected to the front housing. The motor vehicle combined instrument according to the invention also has a loudspeaker which is preferably provided on the front side or rear side of the circuit board. The loudspeaker can be soldered or clipped to the circuit board or connected to the circuit board in some other way. For example it is possible to connect the loudspeaker to the circuit board by means of spring clamps and/or by means of plugs.

According to the invention, the loudspeaker is arranged in and/or on an acoustic element which acts as a Helmholtz Resonator.

Within the meaning of the invention, a Helmholtz resonator is an acoustic system which is composed of an oscillating air plug and a coupled sprung air volume. The air plug has an acoustic mass which results from its geometry and the specific density of the air. It is supported on the sprung air cushion of the air volume. Together both form an oscillating system with a specific resonant frequency which can be easily excited.

The acoustic element is preferably fabricated from plastic, in particular as an injection-molded part.

The acoustic element is preferably embodied at least in certain sections in a cylindrical and/or truncated cone shape. The resonator preferably has a circular cross section, wherein the diameter of the cross section can vary. The junction between two cross sections and/or two different geometries can be effected by means of a shoulder in which the loudspeaker is preferably arranged.

The motor vehicle combined instrument preferably has a rear housing facing away from the vehicle occupant. The front and rear housings are preferably separated by the circuit board. The acoustic element is particularly preferably arranged on the rear housing, in particular on the rear wall (5.1) thereof. The front and rear housings are preferably connected to one another.

According to one preferred embodiment of the present invention, sound insulation is provided between the front or rear housing and the acoustic element. The sound insulation is preferably embodied in the shape of an annulus.

The acoustic element is preferably arranged on the circuit board, in particular connected to the circuit board in a materially joined, positively locking and/or frictionally locking fashion. This connection is preferably made by means of a snap-in connection, for example a clip connection. The acoustic element is preferably arranged on the side of the circuit board facing away from the vehicle occupant, with the result the said acoustic element is located between the circuit board and the rear housing.

At least one cutout is preferably provided in the circuit board, in particular in the region of the acoustic element, through which cutout the sound waves can propagate virtually unimpeded in the direction of the vehicle occupant.

At least one cutout is preferably provided in the front housing and is particularly preferably arranged flush with the cutout in the circuit board. The propagation of the sound waves in the direction of the vehicle occupant is also improved by means of these cutouts.

There is preferably no sound insulation arranged between the circuit board and the acoustic element.

A cavity is preferably provided as a resonant body in the front housing, particularly preferably in the region of the acoustic element.

According to one preferred embodiment of the present invention, the rear housing, in particular the rear wall of the rear housing, does not have any further cutouts around the sound exit region of the acoustic element.

The invention will be explained below with reference to FIGS. 1-7. These explanations are merely exemplary and do not restrict the general inventive concepts.

Figure 1:
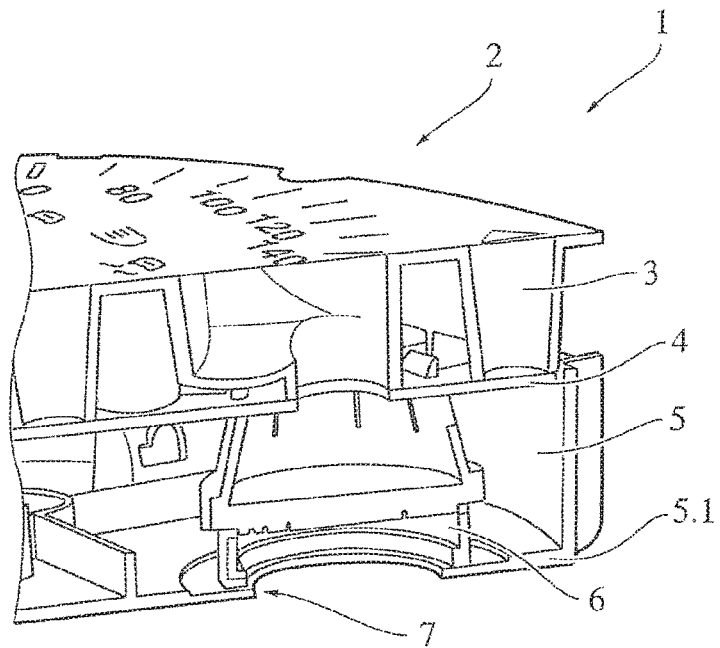
FIG. 1 shows a section through the motor vehicle combined instrument according to the invention.

FIG. 1 shows a section through the motor vehicle combined instrument 1 according to the invention. Said motor vehicle combined instrument 1 has a front housing 3, referred to as a light housing, which is directed toward the vehicle occupant, which housing is provided with a cover 2 in the present part, which cover has, for example, a scale for, for example, a tachometer, but also has a plurality of symbols for warning messages. A circuit board 4, which has electrics/electronics for the motor vehicle combined instrument according to the invention is provided underneath the front housing, i.e. directed away from the vehicle occupant. A rear housing 5, which has a rear wall 5.1 in the present case, is provided underneath the circuit board 4, i.e. directed even further away from the vehicle occupant. An acoustic element 6, which is embodied according to the invention as a Helmholtz resonator, is provided between the circuit board and the rear wall of the rear housing 5. This acoustic element is of cylindrical design in one part and of conical design in a further part. The loudspeaker 9 is located between the conical part and the cylindrical part. In the present case, a seal 7 is provided between the rear wall 5.1 of the housing 5 and the acoustic element 6 and said seal seals off this region against the loss of sound waves.

Figure 2:
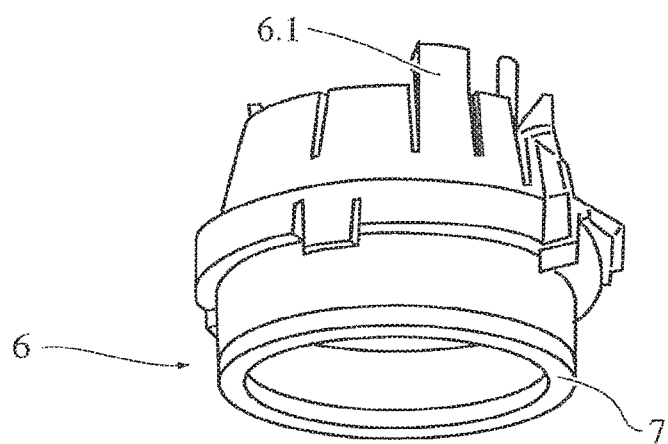
FIG. 2 shows the acoustic element.

FIG. 2 shows details of the acoustic element 6. In particular it is shown that the acoustic element is attached to the circuit board 4 by means of attachment means 6.1, here latching means. In addition, the seal 7 which is provided in the connecting region which connects to the rear wall of the housing 5.1 is shown.

Figure 3:
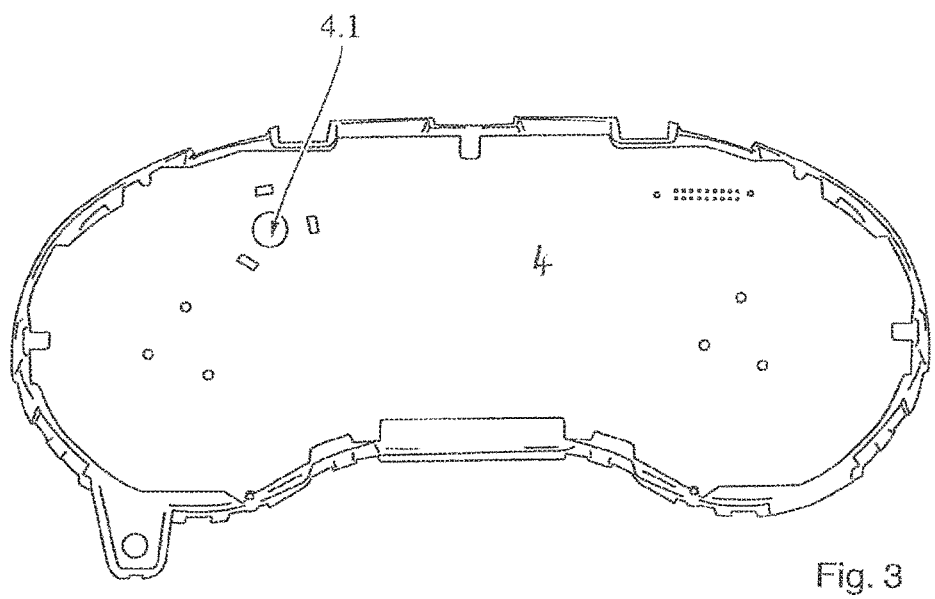
FIG. 3 shows the circuit board.

FIG. 3 shows the circuit board 4. The latter has a cutout 4.1 in the region of the connection to the acoustic element, through which cutout 4.1 the sound waves can pass at least virtually unimpeded in the direction of the vehicle occupant. Furthermore, three cutouts for attaching the acoustic element to the circuit board are shown.

Figure 4:
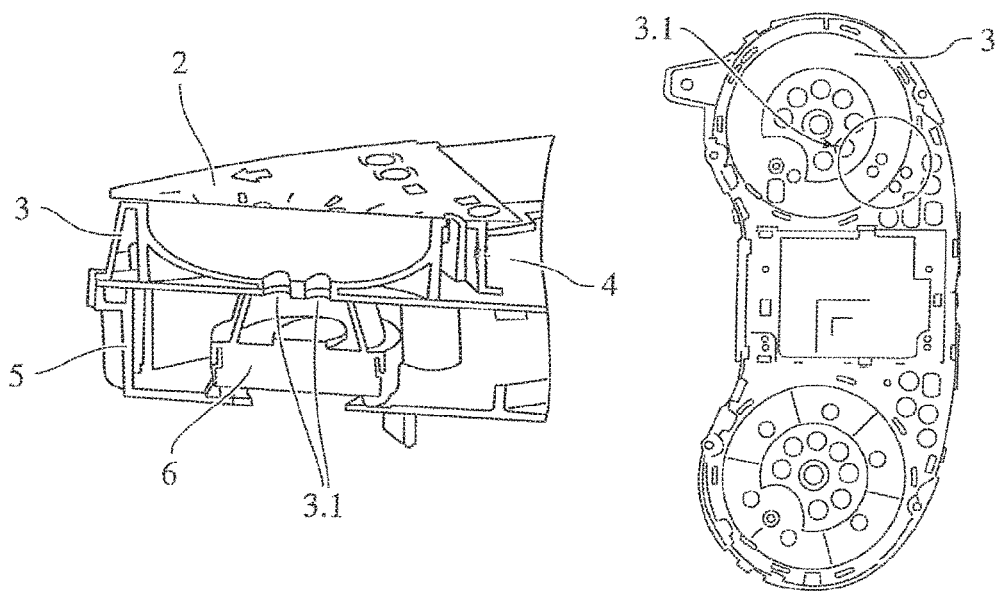
FIG. 4 shows a further section through the motor vehicle combined instrument and a detail of the front housing.

FIG. 4 shows a further detail of the front housing 3. The latter has at least one cutout 3.1, here two cutouts 3.1, which are preferably provided flush with one or more cutouts 4.1 of the circuit board and which in turn cause sound waves to be able to propagate unimpeded in the direction of the vehicle occupant.

Figure 5:
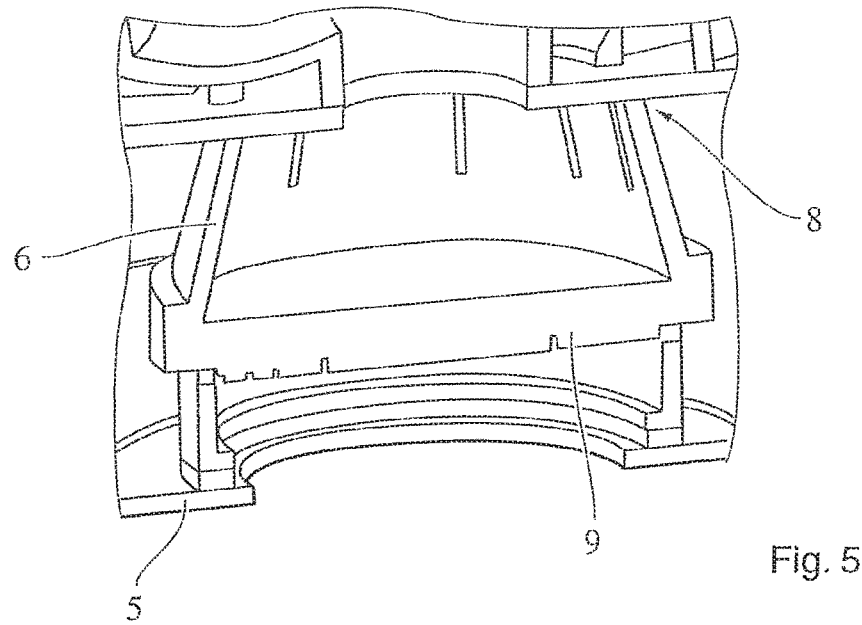
FIG. 5 shows details of the connection between the acoustic element and the circuit board.

On the basis of FIG. 5, a person skilled in the art can infer that no sound insulation is provided between the circuit board 4 and the acoustic element. As a result, the mounting of the acoustic element 6 on the circuit board is simplified.

Figure 6:
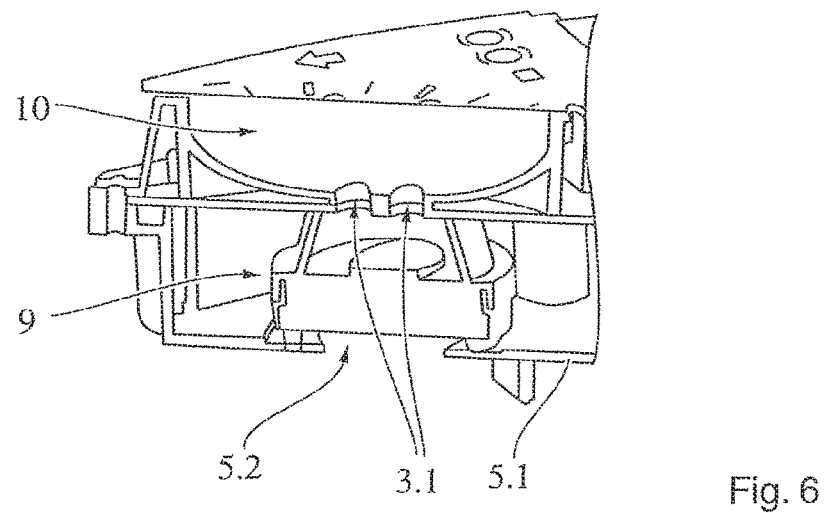
FIG. 6 shows a further section through the motor vehicle combined instrument according to the invention.

According to the embodiment which is shown in FIG. 6, a cavity 10, which preferably serves as a resonator for the sound waves, is provided in the front housing 3. The cavity 10 is preferably provided at least partially flush with the acoustic element 6. The cutout(s) 3.1 is/are provided in the region of the cavity 10.

Figure 7:
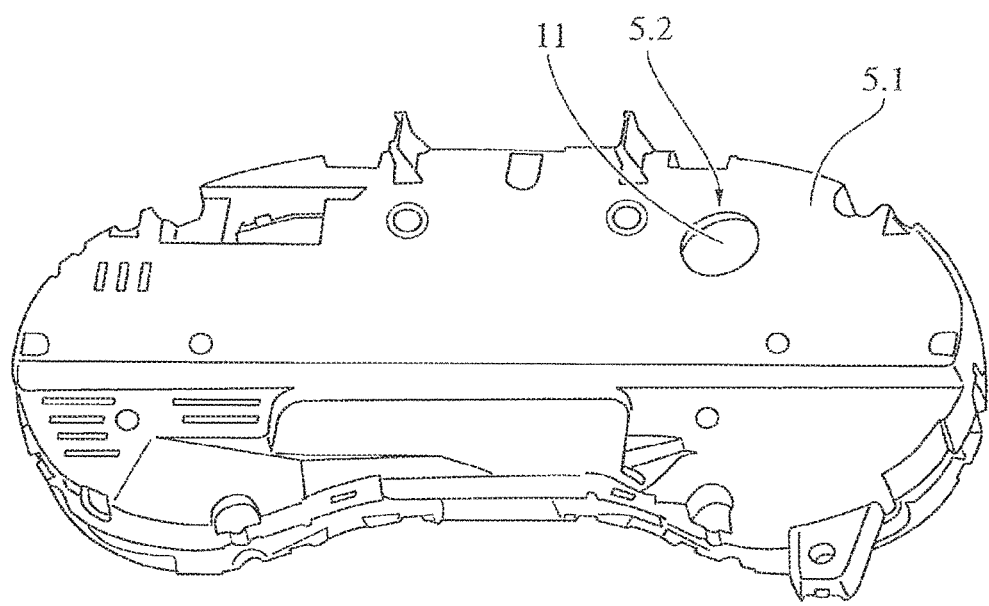
FIG. 7 shows the sound exit region in the rear housing.

FIG. 7 shows the sound exit region 5.2 in the rear housing, here in the rear wall 5.1 of the rear housing. The sound pressure which is generated by the loudspeaker can escape into the region beyond the rear wall through this opening. In the present case, the sound exit opening is provided with a cover which is preferably part of the acoustic element, for example in order to prevent the entry of soiling. The rear housing, in particular the rear wall of the rear housing, preferably has no further cutout(s) around the sound exit region of the acoustic element.

LIST OF REFERENCE NUMBERS

1 Motor vehicle combined instrument of a vehicle
2 Cover, in particular having a scale
3 Front housing, light housing
3.1 Cutout in the upper cover
4 Circuit board
4.1 Cutout
5 Rear housing
5.1 Rear wall of the housing
5.2 Sound exit region in the rear housing, in particular in the rear wall thereof
6 Acoustic element, Helmholtz resonator, tube
6.1 Attachment means, latching means
7 Connection to the rear wall 5.1 of the rear housing 5, seal
8 Connecting region between the circuit board and the acoustic element 6
9 Loudspeaker
10 Cavity
11 Cover of the sound exit region

The invention claimed is:

1. A motor vehicle combined instrument comprising:
a front housing including a cover including an instrument scale, wherein the instrument scale is directed toward a vehicle occupant;
a rear housing facing away from the vehicle occupant; and
a circuit board which is provided on the front housing and which has a loudspeaker, the circuit board separating the front housing and the rear housing,
wherein a first side of the loudspeaker is attached to a first part of an acoustic element which acts as a Helmholtz resonator, the first part of the acoustic element being conical, the first part of the acoustic element connected to the circuit board in at least one of a materially joined, positively locking, or frictionally locking fashion, and a second side of the loudspeaker is attached to a second part of the acoustic element, the second part of the acoustic element being cylindrical.

2. The motor vehicle combined instrument as claimed in claim 1, wherein sound insulation is provided between the rear housing and the acoustic element.

3. The motor vehicle combination instrument as claimed in claim 1, wherein at least one cutout is provided in the circuit board in the region of the acoustic element.

4. The motor vehicle combination instrument as claimed in claim 3, wherein at least one cutout is provided in the front housing and is arranged flush with the cutouts of the circuit board.

5. The motor vehicle combined instrument as claimed in claim 1, wherein no sound insulation is arranged between the circuit board and the acoustic element.

6. The motor vehicle combined instrument as claimed in claim 1, wherein a cavity is provided as a resonant body in the front housing in the region of the acoustic element.

7. The motor vehicle combined instrument as claimed in claim 4, wherein the rear wall of the rear housing does not have any further cutouts around a sound exit region of the acoustic element.

8. The motor vehicle combined instrument as claimed in claim 1, further comprising a seal provided between the acoustic element and the rear housing.

9. The motor vehicle combined instrument as claimed in claim 1, wherein the first part of the acoustic element extending in a first direction from the loudspeaker towards the front housing and decreasing in a size dimension across the loudspeaker and perpendicular to the first direction as the first part extends in the first direction.

* * * * *